UNITED STATES PATENT OFFICE.

JACK FRIEDMAN, OF NEW YORK, N. Y.

WOOD AND METAL POLISH.

1,343,259. Specification of Letters Patent. Patented June 15, 1920.

No Drawing. Application filed July 17, 1919. Serial No. 311,630.

*To all whom it may concern:*

Be it known that I, JACK FRIEDMAN, a citizen of the United States, residing in the city of New York, county of Bronx, and State of New York, have invented a certain new and useful Wood and Metal Polish, of which the following is a specification.

This invention is a composition for use as a polish for wood and metal, and in its entirety embodies the following ingredients; vinegar, raw linseed-oil, water and mineral oil.

The preferred proportions of the several ingredients, by volume, are as follows:

| | |
|---|---|
| Vinegar | ½ gallon. |
| Raw linseed-oil | 1 gallon. |
| Water | 1 gallon. |
| Mineral oil | ¾ gallon. |

In compounding the mixture the several ingredients are mixed together to form the polish. By combining the ingredients in the proportions specified, I find that the resulting polish is highly efficient on both wood and metal. Its action when used as a polish is rapid, and prolonged rubbing is not required. Moreover, the surface treated with this solution is not left tacky or sticky, and the finish resulting from its use is characterized by a transparent sheen.

Different kinds of mineral oils may be employed but I found that base number 3, well known on the market for other uses, gives highly satisfactory results. Crude mineral oil, or one, or a mixture of two or more, of the distillates thereof, not heavier than kerosene, has, in practice, given good results.

Having thus fully described the invention, what I claim as new and desire to secure by Letters Patent is:

1. A composition for use as a wood and metal polish, consisting of vinegar, raw linseed-oil, water and mineral oil.

2. A composition for use as a polish for wood and metal, consisting of two parts vinegar, four parts raw linseed-oil, four parts water and three parts mineral oil.

In testimony whereof, I sign my name to this specification.

JACK FRIEDMAN.